// Patented Feb. 1, 1938

UNITED STATES PATENT OFFICE 2,107,215

METHOD OF MAKING GRANULAR MATERIAL

Ernest Wayne Rembert, Plainfield, N. J.

No Drawing. Application May 24, 1934, Serial No. 727,340. Renewed August 21, 1937

21 Claims. (Cl. 252—2)

This invention relates to a method of making granular material, particularly granules adapted for use in decolorizing.

It is desirable in decolorizing liquids by percolation, for example, to use granules of decolorizing material that are firm and resistant to crushing under the weight of overlying granules and yet are highly porous and, therefore, active as decolorizing material. It is an object of the present invention to provide such granules. Other objects and advantages will appear from the description which follows and the appended claims.

In general, the invention comprises the manufacture of granular material, particularly of granules adapted for use in decolorizing oils or the like, by a process including the following steps: providing fine, water-insoluble particles of decolorizing material of gelatinous outer surface, dispersing the said particles in water in amount sufficient to form a thick paste adapted to minimize flocculation of the dispersed particles, removing water from the paste to adapt the product to be granulated, and then granulating the product. If desired, the granulated material is subjected to treatment to remove additional quantities of water, as by complete or partial drying.

An embodiment of the invention that is preferred at this time is illustrated by the following specific examples.

Example 1

As the raw material there is used a clayey material adapted for use as a decolorizing material, of which fuller's earth is taken as an illustrative example. To the fuller's earth is added sufficient water to make the proportion of total water approximately 65 to 75 parts to 35 to 25 parts by weight of solid material.

Advantageously, the water is heated, say to the boiling point, to increase the rate of forming a gelatinous surface on the particles of fuller's earth. The mixture so made is then subjected to vigorous agitation to form a thick paste containing dispersed particles of earth with surfaces rendered gelatinous by the water associated therewith. In this condition the paste is adapted to minimize the flocculation of the dispersed particles after the agitation is discontinued, possibly because the paste is relatively thick, and, for this reason, retards the migration and agglomeration of the individual particles into larger clusters.

The pasty composition so made is then treated to remove a part of the water therefrom, to convert the composition to a form in which it is relatively non-tacky and adapted, therefore, to be granulated without excessive adherence to the granulating equipment, and, on the other hand, is not thoroughly dehydrated and is also adapted to be readily wetted by additional water applied thereto. This removal of water to form a composition of properties specified may be made by forming the paste into a thin band or shape, as by extrusion through a horizontal slit onto a moving conveyor belt, followed by incomplete drying, as, for example, at an elevated temperature, such as 220 to 250° F., preferably in a humid atmosphere, to prevent skin hardening of the particles being granulated. The exact extent of the drying which is required for a given composition is readily determinable by a few simple tests of the composition being treated. In the case of fuller's earth, the drying at this stage may be conducted until the percentage of moisture in the partially dried material for granulation is approximately 30%.

The thus partially dried material is next subjected to granulation to size desired. Thus it may be made into particles which will pass through a 15 to 30 mesh screen. In making particles of such size by conventional granulating equipment, including a crusher or grinding means, for example, there is made of necessity, as a by-product, a considerable proportion of material that may be finer than desired, as, for example, so fine as to pass through a 60 to 90 mesh screen. Such fine particles may be separated by screening and then returned to another batch of original raw material and water.

Because the excessively fine particles so produced contain sufficient water to adapt them to be readily wetted by additional water applied thereto, they may be dispersed in the aqueous composition, say along with fresh fuller's earth, to form a pasty composition ready for the second step in the process described above. Thus, it is seen that the choice of the minimum proportion of water left in the pasty composition after drying, preferably not less than 35% permits complete reuse of the fine particles, with consequent avoidance of a loss of material that otherwise would be considerable.

The granules of desired size may be finished in any suitable manner. Thus, they may be subjected to additional drying to lower the moisture content to the optimum for use of the material in decolorizing. In a typical preparation, the moisture contained in the granules was lowered by the final drying operation to less than 1%. This final drying operation suitably is conducted at an elevated temperature, such as 800 to 900° F.

Example 2

The method of Example 1 is followed except that the original raw material used is a sub-bentonite or clay adapted to make an active decolorizing material on treatment with acid, and that there is a variation also in the final drying. The clay is treated with an excess of a suitable mineral acid, say dilute sulphuric acid containing approximately 15 parts of sulphuric acid to 85 parts of water by weight. The treatment is conducted in conventional manner, say at 130° F. for several hours, after which the acid is removed, as by draining followed by washing the treated bentonite with water.

The bentonite is then made into a thick paste by vigorous agitation, after the addition of a small proportion of water, if necessary, in addition to that present in the washed bentonite. The thick paste is thereafter dried and granulated as above described. Finally, the granulated product is dried to contain about 10 to 20% moisture, the drying being conducted under the controlled conditions described in Example 3.

Example 3

There is first formed a precipitated magnesium silicate, suitably by the interaction of finely divided silica and a slightly soluble magnesium compound. Precipitated basic magnesium carbonate, of the type conventionally made for use, in association with asbestos fibers, in so-called 85% magnesia for thermal insulation, is mixed with water, very finely divided silica such as pulverized diatomaceous earth, and a catalyst or reaction accelerator such as sodium or potassium carbonate. These materials may be mixed in such proportion as to contain the proportion of 0.4 to 0.8 mole of magnesia, suitably 0.5 mole, and 0.05 mole of sodium carbonate to 1 mole of silica, water being present in the proportion of ½ to 1 gallon of water per pound of total solids. The mixture is caused to react at an elevated temperature, as at 300° F., in an autoclave, with continuous agitation, until the reaction is substantially complete.

The concentration of sodium carbonate present during the reaction should be selected carefully, to avoid a concentration so low as not to accelerate satisfactorily the interaction of the magnesia compound and the silica and, on the other hand, to avoid a concentration so high as to leave an excessive amount of soluble silicate in the finished product. In general, the concentration of sodium carbonate or like catalyst or carrier present in the aqueous solution may be less for relatively higher temperatures (steam pressures) and longer periods of reaction than for lower temperatures and shorter periods. Thus the concentration, expressed as parts of sodium carbonate for 1000 parts by weight of water required to give products of comparable efficiencies, may be as low as 0.4 when the reacting mixture is autoclaved at 100 to 200 pounds gauge steam pressure per square inch for 1 hour's time, 2.5 for 50 pounds and 2 to 4 hours', and 10.0 for 25 pounds and 2 to 4 hours'.

The reacted product contains a high proportion of hydrous magnesium silicate in the form of a pseudomorph corresponding roughly to the shape and size of the particles of basic magnesium carbonate initially used. These aggregations of precipitated magnesium silicate contain particles that are individually very fine and amorphous and of gelatinous surface, in a mixture with the excess of water originally used.

The reaction and preparation up to this point may be made as described in applications Serial Numbers 529,269 and 529,281 for United States patents, both filed by me on April 10, 1931.

The aqueous mixture made as described above is next subjected to treatment to remove a large part of the excess water. Suitably, this water is separated mechanically, as by filtration on a rotary filter or other equipment, to form a filter cake or non-fluent mass. The filter cake is washed to remove water-soluble material. When the precipitation has been made in an alkaline solution of alkalinity, at the end of the precipitation, corresponding to at least that given by approximately one-tenth normal to normal solutions of sodium carbonate, the washed cake may be dried to the optimum moisture content for maximum decolorizing power and milled to grade desired, for example, to a fine powder suitable for the "contact" decolorizing process or to granules adapted for the "percolation" process of oil decolorization.

But, to obtain the maximum decolorizing efficiency in the finished product and adapt the product to satisfactory revivification subsequent to use in decolorizing operations, it is desirable to neutralize approximately the mixture containing the precipitate. In effecting this neutralization, the washed filter cake is removed from the filter, dispersed in water to form a slurry, and is then treated with dilute acid, say with sulphuric acid of concentration 5 parts by weight of the acid to 95 parts of the water. The dilute sulphuric acid is stirred into the slurry in amount sufficient to make the resulting mixture neutral to litmus. In effecting this neutralization treatment, the particles are flocculated to a much greater extent than in the original filter-cake.

The thus neutralized material may be again filtered, washed and then subjected to special treatment to offset undesirable effects of the neutralization step upon the density and firmness of the ultimate granules. In this special procedure the neutralized and washed filter cake is removed from the filter and subjected to vigorous mixing, as, for example, in a Day mixer including a mixing vessel and a pair of spaced rapidly rotated agitator arms. The agitation is made without the addition of water to the wet filter cake and there is produced deflocculation or dispersion of the solid particles in the water present, largely in the form of individualized very fine particles, to produce a pasty or relatively non-fluent composition adapted to minimize flocculation of the relatively, fine water-insoluble particles of gelatinous surface dispersed therein.

It has been found that the final density of the granular material is determined to some extent by the percentage of water in the paste prior to drying, the density increasing with decrease in water content and being, therefore, controllable through control of this factor. For example, a final product made from a paste containing 30% solids may give a density of 24 to 26 pounds to the cubic foot, whereas one made from a paste containing 40% solids may have an apparent density of 28 to 30 pounds to the cubic foot. The moisture content of the paste should be maintained above the figure which will give a density of about 30 pounds to the cubic foot, since, for a greater density, the decolorizing efficiency of the material begins to drop. It is believed that the water in the paste acts as a spacing agent, higher percentages of water giving greater shrinkage but lighter finished products. One method for controlling the water content of the paste, providing the quantity in the filter cake is too high, is that of introducing into the mixture, at a convenient stage, a relatively dry fine material, which is recycled in the process.

In converting the paste into granules, the deflocculated, pasty mixture is formed into a thin shape and subjected to partial drying. For example, the deflocculated mixture, including magnesium silicate dispersed in water, is caused to flow under pressure through a horizontal extrusion slit in the form of a stream of substantial width and little thickness, say 1 inch, and onto a conveyor belt. The conveyor belt and paste carried thereby are passed through a dryer maintained at an elevated temperature. Thus, the thin sheet of material may be subjected to a temperature of 212° F. for a period of time that is preferably short, say less than 1 hour, to lower the moisture content of material in the sheet to approximately 35 to 45% by weight, the moisture content of the exterior surfaces of the sheet being not below 25%. It has been found that a material so dried is non-tacky and is adapted to be sent through granulating equipment, as described below, to produce satisfactory granulation without excessive adherence to the equipment, and, on the other hand, is readily wetted when additional water is applied thereto and then dispersed by agitation in the water so applied.

The material thus dried is sent through granulating equipment which may include a crusher and a series of screens and accessories for separating out particles of desired size, returning oversized particles to the crusher for further crushing, and returning undersized fine particles to a new batch undergoing deflocculation. The undersized or fine particles mixed with the new batch are dispersed therein, like so much fresh material, and the deflocculated mass is again formed into a thin shape, subjected to partial drying, further granulation, return of the fines for dispersion, and so on, until substantially all the fine particles are obtained in the form of granules of desired size. Such a desired size is represented by particles which will pass through a 15 to 30 mesh screen and be retained on a 30 to 60 mesh screen. Granules of such size, that are coarser than 60 mesh, combine the desirable properties of large exposed surface, high decolorizing efficiency, ready percolation of oil therethrough, and adequate strength.

Finally, the granules of desired size are subjected to additional drying, that is, are incompletely dehydrated, to reduce the moisture content to the optimum proportion and develop the maximum adsorptive properties for use in decolorizing liquids. This final drying, also, should be done in a limited time and, preferably, very quickly, say in 5 to 15 minutes, to minimize shrinkage with attendant collapse of structure and closing of the pores. In this manner, the structure and porosity are preserved. This final drying may be accomplished by suspending the granules in an air stream at a temperature of approximately 200° to 250° F. and then separating them from the air stream, as in cyclonic separators. The atmosphere of drying should be relatively humid, to avoid skin hardening. The granules may be dried to approximately 8 to 10% by weight of water.

The equipment used in connection with Examples 1 to 3 is an assembly of parts that are conventional. Since the equipment forms no part of the invention, its illustration by drawings is considered unnecessary.

The granules of material made in accordance with this invention contain particles that are individually very fine and amorphous, aggregated in such manner as to present collectively a relatively large surface for adsorption. Such granules contain pores extending into the interior and communicating with an exposed surface of the granule and rendering the interior of the granule accessible or available to liquids that are to be decolorized. The pores represent a part of the volume of water present at granulation and subsequently removed. The granules are resistant to crushing under moderate load, adapted, for example, to support the weight of overlying granules when used in a system of decolorizing by percolation, as will be described later, and resistant to abrasion during use, steaming, revivification, handling or conveying.

When additional strength of particles is required, a limited proportion, say 5% by weight, of bentonite or like gelatinous, colloidal material may be added to the paste prior to its being formed into a thin shape for drying and granulating. The material is then finished in regular manner.

In decolorization of an oil, for example, with my material usual equipment may be used, including a tower. This tower is filled with the granular decolorizing material to a depth of say 20 feet and the oil to be decolorized is caused to percolate slowly through the bed of granules at a selected temperature, as, for example, 140° F.

The term "precipitated" is used herein to define material produced in the solid state by a chemical reaction. Such precipitated material contains very fine particles, is particularly adapted for the present purposes, and is to be distinguished from naturally occurring, less effective decolorizing materials.

Decolorizing media may be formed, as described, of other multivalent metal silicates or similar compounds that are water-insoluble and adapted to have adequate adsorptive and decolorizing properties, particularly silicates or like compounds of aluminum or other amphoteric metals or of the alkaline earth metals. In making compounds other than magnesium silicate, there should be followed the method illustrated in the case of magnesium silicate, with the substitution of proper raw materials for those described, or a method given in the said pending applications supplemented by the novel steps described herein. Thus, in making aluminum silicate, the initial step may comprise the interaction of an aluminum compound that is at least slightly soluble, suitably aluminum hydroxide, with a solution of a silicate in water, to form a precipitate of aluminum silicate. Once the silicate is precipitated, it is finished by the method described herein. The carrier, such as carbonate of sodium or potassium, is used when the siliceous material used is not very soluble in water, as in the case when the material is silica. In any case, even when using a soluble silicate, it is desirable to establish at the outset an alkalinity corresponding to that of approximately 0.1 to 0.5 normal sodium hydroxide, to minimize hydrolysis.

The term "gelatinous" as used herein indicates a surface condition which is readily adherent.

The details that have been given are for the purpose of illustration and not restriction. Many variations therefrom may be made within the scope of the appended claims.

What I claim is:

1. In making an improved decolorizing material, the method which includes producing, in the presence of an excess of water, a water-insoluble, hydrous multivalent metal compound adapted to possess decolorizing properties when in incompletely dried form, removing a substantial proportion of the said excess of water to form a wet, non-fluent mass containing the compound and residual water, agitating the mass, to convert the mass to pasty form, partially drying the pasty material to render it non-tacky and adapted to be granulated without excessive adherence to the granulating equipment, granulating the thus dried mass, and then incompletely drying the granules to develop the maximum adsorptive properties in the product.

2. In making an improved decolorizing material, the method which includes producing, in the presence of an excess of water, a water-insoluble, hydrous multivalent metal silicate adapted to possess adsorptive properties when in incompletely dehydrated form, removing mechanically a large part of the excess of water to form a wet, non-fluent mass containing the silicate and residual water, washing the non-fluent mass with water to remove soluble materials present therein, approximately neutralizing the washed mass by treatment with dilute acid, again removing excess of water to form a non-fluent mass, then agitating the resulting mass, to deflocculate the solid and convert the mass to pasty form, then partially drying the pasty material to render it non-tacky and adapted to be granulated, without excessive adherence to the granulating equipment, granulating the thus dried mass, and then incompletely drying the granules to develop the maximum adsorptive properties in the product.

3. In making an improved decolorizing material, the method which includes providing particles of decolorizing material of gelatinous surface, forming a mixture of the particles with water, agitating the mixture to deflocculate the particles therein and convert the mixture to pasty form, removing water from the pasty material to render it non-tacky and adapted to be granulated, without excessive adherence to the granulating equipment, but adapted to be readily wetted by water applied thereto and deflocculated in the said water by agitation, granulating the thus dried mass to form particles of desired size and undersized particles, separating the undersized particles from the particles of desired size, mixing the undersized particles with an aqueous composition, deflocculating the undersized particles therein by agitation, and subjecting this deflocculated product to a repetition of the above described operations, whereby the undersized particles are eventually converted to granules of the desired size.

4. In making granules of fuller's earth, the method which comprises providing fuller's earth in the form of particles adapted to be given gelatinous surfaces by treatment with water, rendering the surfaces gelatinous by vigorous agitation with water, dispersing the particles in water to form a thick paste adapted to minimize flocculation of particles therein, then removing a portion of the water from the paste to adapt it to granulation, granulating the resulting product, and drying the resulting granules to a moisture content of approximately thirty per cent, to develop maximum decolorizing power.

5. In making granules of clay adapted for use as a decolorizing material, the method which comprises treating the clay with a mineral acid to increase the decolorizing power, removing the acid from the treated clay, forming the product into a non-fluent mass, then dispersing the product in water to form a thick paste including the product largely in the form of individualized very fine particles, removing a portion of the water from the paste to adapt it to granulation, and granulating the resulting material.

6. In making granules of clay adapted for use as a decolorizing material, the method which comprises treating the clay with a mineral acid to increase the decolorizing power, removing the acid from the treated clay, forming the product into a non-fluent mass, then dispersing the product in water to form a thick paste including the product largely in the form of individualized very fine particles, removing a portion of the water from the paste to adapt it to granulation, granulating the resulting material, and drying the granules produced to develop maximum decolorizing power.

7. In making an improved decolorizing material, the method which includes producing, in the presence of an excess of water, a water-insoluble, hydrated multivalent metal silicate adapted to possess adsorptive properties when in incompletely dehydrated form, removing mechanically a large part of the said excess of water, and then incompletely drying the remaining wet silicate by subjecting it to an elevated temperature in a humid atmosphere adapted to reduce quickly the residual water content to the optimum, with preservation of the structure and porosity of the material being dried.

8. In making an improved decolorizing material, the method which includes precipitating, in the presence of an excess of water, a water-insoluble, hydrated multivalent metal silicate adapted to possess adsorptive properties when in incompletely dehydrated form, removing mechanically a large part of the said excess of water, then incompletely drying the remaining wet silicate by subjecting it to a temperature of approximately 220 to 250° F. for a period not substantially longer than 15 minutes, granulating the partially dried product, and then subjecting the granules to additional incomplete, quick drying, to develop maximum decolorizing properties therein, and to prevent skin hardening thereof.

9. A granular composition of matter, adapted for use as a decolorizing medium, comprising a precipitated adsorbent silicate of a multivalent metal and bentonite admixed therewith, the bentonite being present in limited proportion to increase the strength of the granules.

10. Granules for use as a decolorizing medium comprising an intimate mixture of decolorizing clay and a precipitated adsorbent silicate of a multivalent metal of the kind described, the clay serving to bond together the said silicate and increasing the firmness of the granules.

11. A composition of matter, adapted for use as a decolorizing medium for a liquid, comprising an adsorbent, precipitated silicate of an alkaline earth metal, in the form of firm granules that are resistant to crushing under moderate loads, contain an agglomerate of finely divided individual particles of the said silicate, and are provided with pores extending into the interior and communicating with an exterior surface of the granules, whereby the interior of the granules is made available for decolorizing the said liquid.

12. A composition of matter, adapted for use as a decolorizing medium for a liquid, comprising substantially neutral precipitated adsorbent silicate of magnesium, in the form of firm granules that are resistant to crushing under moderate loads, of size largely coarser than 60-mesh, contain an agglomerate of finely divided individual particles of the said silicate, and are provided with pores extending into the interior and communicating with an exposed surface of the granules, whereby the interior of the granules is made available for decolorizing the said liquid.

13. A method of producing a granular decolorizing material adapted for the decolorization of mineral and vegetable oils by the percolation decolorization process, which comprises forming a hydrous magnesium silicate compound by the interaction of a slightly soluble magnesium compound and silica in the presence of water, filtering the magnesium silicate from the reaction mixture, producing thereby a moist but nonfluent filter cake, agitating the filter cake thus produced to an extent sufficient to produce a pasty mass and deflocculate the magnesium silicate, drying the deflocculated pasty mass sufficiently to produce a solid material suitable for granulation, and disintegrating the dried solid material into granules of a size suitable for use in the percolation decolorization process.

14. A method of producing a granular decolorizing material adapted for the decolorization of mineral and vegetable oils by the percolation decolorization process, which comprises forming a moist but nonfluent mixture of water and a hydrous magnesium silicate having high decolorizing efficiency, agitating the mixture to an extent sufficient to produce a pasty mass and deflocculate the magnesium silicate, drying the deflocculated pasty mass sufficiently to produce a solid material suitable for granulation, and disintegrating the dried solid material into granules of a size suitable for use in the percolation decolorization process.

15. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, dispersing the magnesium silicate in the mixture to produce a deflocculated pasty mass, drying the deflocculated pasty mass sufficiently to produce a solid material suitable for granulation, and disintegrating the dried solid material into granules of a size suitable for use in the percolation decolorization process.

16. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, the moisture content of the mixture being in excess of that resulting in a density in excess of about 30 pounds to the cubic foot in the final product, agitating the mixture to an extent sufficient to produce a pasty mass and deflocculate the magnesium silicate, drying the deflocculated pasty mass sufficiently to produce a solid material suitable for granulation, and disintegrating the dried solid material into granules of a size suitable for use in the percolation decolorization process.

17. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, the proportion of solids present in said mixture constituting from about 30% to 40%, agitating the mixture to an extent sufficient to produce a pasty mass and deflocculate the magnesium silicate, drying the deflocculated pasty mass sufficiently to produce a solid material suitable for granulation, and disintegrating the dried solid material into granules of a size suitable for use in the percolation decolorization process.

18. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, the proportion of solids present in said mixture constituting from about 30% to 40%, agitating the mixture to an extent sufficient to produce a pasty mass and defloc- culate the magnesium silicate, drying the deflocculated pasty mass to lower the moisture content to about 35 to 45% by weight to produce a solid material suitable for granulation, and disintegrating the dried solid material into granules of a size suitable for use in the percolation decolorization process.

19. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, the proportion of solids present in said mixture constituting from about 30% to 40%, agitating the mixture to an extent sufficient to produce a pasty mass and deflocculate the magnesium silicate, drying the deflocculated pasty mass to lower the moisture content to about 35 to 45% by weight to produce a solid material suitable for granulation, and disintegrating the dried solid material into granules of a size suitable for use in the percolation decolorization process and classifying the disintegrated material into granules capable of passing a 15-mesh screen and retained on a 60-mesh screen.

20. A method of producing a granular decolorizing material adapted for the decolorization of mineral and vegetable oils by the percolation decolorization process, which comprises forming a moist but non-fluent mixture of water and a hydrous magnesium silicate having high decolorizing efficiency, the proportion of solids present in said mixture constituting from about 30% to 40%, agitating the mixture to an extent sufficient to produce a pasty mass and deflocculate the magnesium silicate, drying the deflocculated pasty mass to lower the moisture content to about 35 to 45% by weight to produce a solid material suitable for granulation, disintegrating the dried solid material into granules of a size suitable for use in the percolation decolorization process and further drying the granules to a moisture content not less than about 8% by weight.

21. A composition of matter, adapted for use as a decolorizing medium for a liquid, comprising an adsorbent, precipitated silicate of magnesium, in the form of firm granules that are resistant to crushing under moderate loads, contain an agglomerate of finely divided individual particles of the said silicate, and are provided with pores extending into the interior and communicating with an exterior surface of the granules, whereby the interior of the granules is made available for decolorizing the said liquid.

ERNEST WAYNE REMBERT.